July 9, 1968   W. R. WHEELER ET AL   3,391,901
HIGH VACUUM LEAK VALVE
Filed Sept. 30, 1964
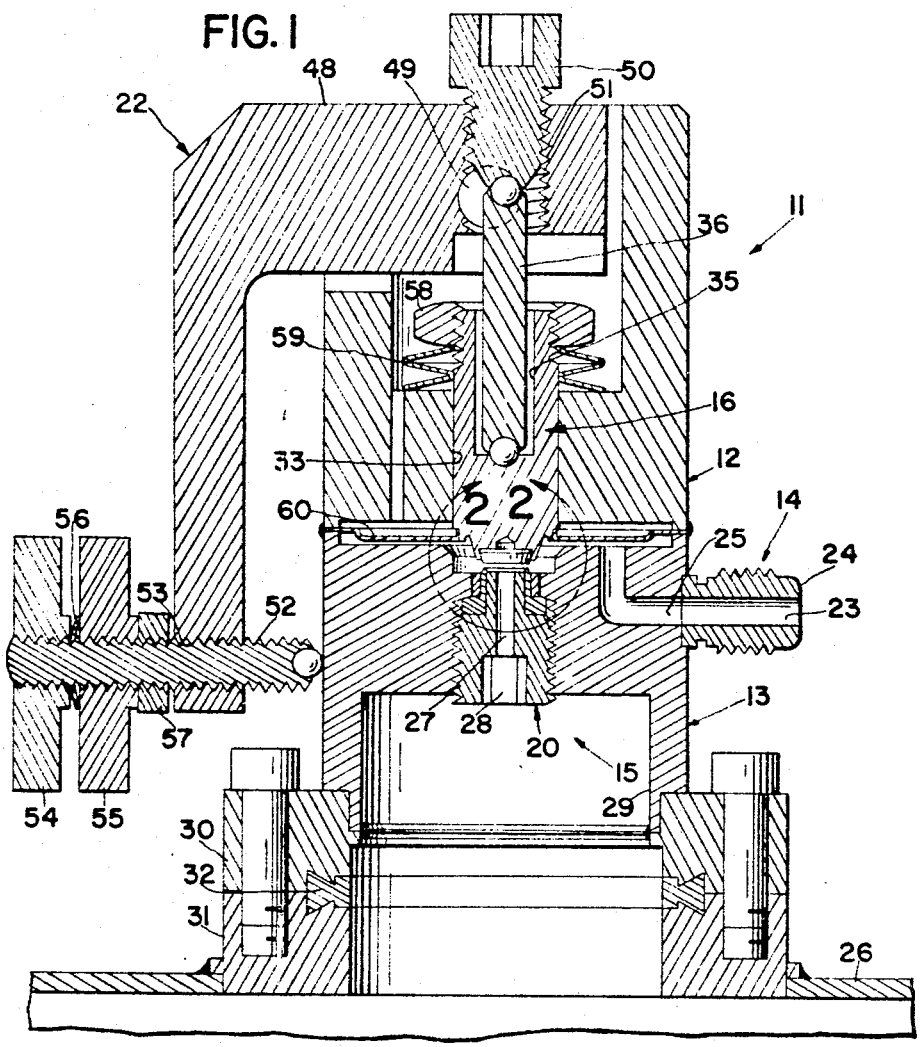
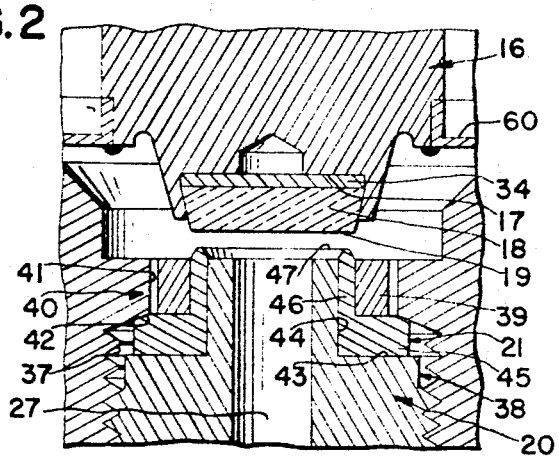
INVENTORS
WILLIAM R. WHEELER
PAUL W. HAIT
BY
*Wm. A. Nolan*
ATTORNEY

3,391,901
HIGH VACUUM LEAK VALVE

William R. Wheeler, Saratoga, and Paul W. Hait, Palo Alto, Calif., assignors to Varian Associates, Palo Alto, Calif., a corporation of California
Filed Sept. 30, 1964, Ser. No. 400,515
6 Claims. (Cl. 251—246)

This invention relates to high vacuum valves and particularly to high vacuum leak valves useful in introducing a very stable and extremely small flow (on the order of $10^{-10}$ torr liters/sec.) of gas into a vacuum system.

Good ultra-high vacuum technique normally entails high temperature (on the order of 450° C.) bakeout of vacuum system components in order to produce outgassing thereof. Such procedures condition the vacuum system's internal walls so as to greatly reduce the system pressure attainable, in addition to reducing the time required to achieve lower pressures. This has led, therefore, to the development of a number of different types of high vacuum valves which are characterized by their bakeable (usually all-metal) construction.

Beyond bakeability, the major requirement of presently available high vacuum valves is that it be able to create and maintain a seal through many cycles of operation without affecting the vacuum tight sealing capabilities incident to the valve. In one type, a seal is formed when a hard metal member is embedded in a soft metal member. In another, a soft metal member is crushed between a pair of hard metal members. In still another, a hard metal member is immersed in a molten metal. The molten metal is allowed to solidify by cooling, thereby completing a seal.

Such prior art high vacuum valves, while adequate for the purpose for which they have been designed, are generally unsuitable as leak valves where it may become necessary to introduce a very stable and extremely small flow of gas into a vacuum system. A typical application for a leak valve is in a gauge calibration system of the type disclosed in co-pending application Ser. No. 234,037, filed Oct. 30, 1962 now Patent No. 3,245,256 and assigned to the same assignee as the present invention, in which gas molecules must be introduced into a calibration chamber at a very slow and steady rate. Another typical application for a leak valve is in a low energy electron diffraction apparatus of the type disclosed in co-pending application Ser. No. 335,793, filed Jan. 6, 1964 now Patent No. 3,313,936 and assigned to the same assignee as the present invention, in which pure gases and gas mixtures are admitted into a diffraction chamber at a very low and controlled rate.

It is the object of the present invention to provide a bakeable, high vacuum leak valve capable of introducing a very stable and extremely small flow of gas into a vacuum system which is convenient and reliable in operation.

One feature of the present invention is the provision of a high vacuum leak valve in which a seal is formed between a captured metal gasket and an optically smooth hard surface.

Another feature of the present invention is the provision of a mechanical drive for a high vacuum leak valve which is capable of controlling a very small, exact motion which is exponential in character.

These and other objects and features of the present invention and a further understanding may be had by referring to the drawing wherein:

FIG. 1 is a cross-sectional view of the novel high vacuum leak valve of the present invention; and, FIG. 2 is an enlarged cross-sectional view of the valve seal area enclosed by the circle 2—2 of FIG. 1.

Referring now to the drawing there is disclosed the novel high vacuum leak valve 11 of the present invention comprising: cylindrical upper 12 and lower 13 shells; an inlet 14 and an outlet 15; a movable valve member or piston 16 positioned within the upper shell 12 having a recessed cavity 17 at its lower end in which is disposed a hard bakeable member 18 having an optically smooth closure surface 19, as of sapphire; a valve seat 20 removably positioned within the lower shell 13 including a captured metal gasket 21 which forms a vacuum-tight seal at its lower end with the lower shell 13 and, upon valve closure, a vacuum tight seal at its upper end with the optically smooth closure surface 19, which seal is completely free from friction or seizing; and, a valve actuating mechanism 22 for reciprocating the valve member.

The upper 12 and lower 13 shells, as of stainless steel, may be integral but are shown as welded together in vacuum-tight manner, and with the outer periphery of a relatively stiff, thin, apertured diaphragm piston locater 60 welded therebetween, the inner periphery of which is welded to the movable piston 16 to provide a flexible, vacuum-tight joint between the lower shell 13 and the piston 16. A fluid may be introduced through the inlet 14, which includes the conduit 23 in a threaded fluid or gas nipple 24 welded to the lower shell 13 and an elbow passage 25 in the lower shell 13 aligned with the conduit 23. The nipple 24 is designed to be connected to tubing of high vacuum material leading from a fluid or gas source (not shown). The inlet 14 could, of course, be designed to extend at any desired angle to the valve 11.

The outlet 15 of the valve 11, which also provides access into a vacuum system 26, includes conduits 27, 28 in the valve seat 20 and a passageway 29 in the shell 13. A vacuum sealing flange 30, as of stainless steel, is welded to the end of the lower shell 13 in vacuum-tight manner and is adapted to mate with another sealing flange 31 welded about an opening into the vacuum system 26, which flanges, upon relative movement therebetween, serve to compress a copper gasket 32 so as to form a vacuum-tight joint therebetween.

The valve member or piston 16 is adapted for reciprocal movement within a close-fitting, elongated passageway 33 within the upper shell 12. It has a recessed cavity 17 at its lower end in which is tightly disposed a soft metal washer 34 and the disc-like closure member 18, and a passageway 35 extending into its upper part which is adapted to receive a rod link 36 of the valve actuating mechanism 22.

The use of a hard member 18 (and which is bakeable if the valve is to be baked) having an optically smooth closure surface 19 is essential to prevent interlocking and seizure at the seal interface and thereby enable very smooth control of extremely small leaks. Interlocking occurs in prior art devices, especially during bakeout, at the seal interface due to flowing and interlocking of molecules of the valve seat and closure surface material. Then, when the surfaces are drawn apart, the ensuing seizure by the one element of some of the material of the other element leaves both seal and closure surface sufficiently rough to prevent control of sensitivity and stability at very small leak rates thereafter. Besides sapphire, carbide and stellite are satisfactory for the purposes of the present invention in that they hold their shape, may be highly polished, do not scratch easily, do not anneal at high temperatures and permit smooth separation after sealing.

The valve seat 20, which is threadedly engaged within a threaded channel 37 in the lower shell 13 includes a retaining sleeve 38, as of stainless steel, a gasket ring 21, as of copper, disposed about the sleeve 38, and a collar 39, as of stainless steel, disposed about the gasket ring 21. The channel 37 terminates at a neck 40 having a vertical inner 41 and slanted side 42 wall. The retaining sleeve 38 is provided with an outer step 43 and riser 44. The gasket ring 21 is provided with a horizontal lower portion 45 and a vertical upper portion 46 which fit tightly against the step 43 and riser 44, respectively. The upper portion 46 has a seating surface 47 which extends slightly above the collar 39. Upon installation, the collar 39 and the upper portion 46 of the gasket ring 21 fit within the neck 40, while the lower portion 45 of the gasket ring 21 is crushed between the retaining sleeve 38 and the slanted side 42 of the neck 40 such that a vacuum tight seal is formed between the lower shell 13 and the valve seat 20.

In order to assure that the upper portion of gasket ring 21 is captured and fully supported, after the gasket ring 21 is slipped over the retaining sleeve, and the collar 39 slipped over the upper portion 46 of gasket ring 21, the valve seat 20 is placed in a press and the gasket ring 21 squashed, to fill up any clearances and voids in pretension collar 39 and riser 44.

Upon actuation of the movable piston 16 a vacuum-tight seal is created between the closure surface 19 and the sealing surface 47 of the gasket ring 21. Because the upper portion 46 of the gasket ring 21 is captured and fully supported between the collar 39 and riser 44 throughout almost all of its height, very great pressures may be developed at the seal interface which are much higher than the yield strength of the gasket material, even when subjected to bakeout.

The seating surface 47 of the metal gasket ring 21 is compressed each time a seal is made. When operating at room temperature, permanent compression does occur with each closure but is too small to be measurable. After several hundred cycles the gasket height will be reduced to the point where the gasket must be replaced to assure complete valve closure. This replacement will be somewhat more frequent with high temperature bakeouts due to annealing and compression of the gasket material. The use of a tapered seating surface assures that the required sealing force is not greatly increased with each successive closure due to over-expansion of the gasket-closure contact area. A curved surface could also be used.

In a typical embodiment the seating surface 47 has an initial height between 0.006–0.012 inch and base width between 0.015–0.020 inch, and when tapered has an initial width across the top approximately ⅓ its base width.

In order to offer control sensitivity and stability over a wide range of leak rates and to very low values, the valve actuating mechanism 22 must be capable of controlling motions on the order of a few millionths of an inch, must be monotonic unambiguous and exactly repeatable. Moreover, the motion should be exponential in character since one may wish to control as many as 10 or 11 decades of leak range.

The foregoing objects are accomplished in the present invention by the provision of a valve actuating mechanism 22 which includes: a free-riding rod link 36 having ball socketed ends; a handle 48 pivoted about a rod 49 anchored in the upper shell 12; an adjustable roughing screw 50 to provide a first rough setting of the closure surface 19 threaded within a threaded channel 51 in the handle 48 and engaging the top of the ball socketed link 36; a screw threaded through another threaded opening 53 in the handle 48 having a ball socketed end contacting the lower shell 13 and control knobs 54, 55 to provide an adjustable stop with a washer 56 disposed therebetween for turning the screw 52 to cause pivotal motion of the handle 48, and reciprocal motion of the link 36, piston 16 and closure surface 19; a collar stop 57 threaded on the screw 52, a nut 58 threadedly engaged about the upper end of the piston 16; and, spring washers compressed between the nut 58 and the upper shell 12 for preloading and to prevent back-lash.

From the foregoing description, operation of the valve should be readily apparent. With the valve 11 connected in vacuum-tight manner to the system 26, a fluid may be introduced through the inlet 14 from a gas source (not shown) at pressures up to 500 p.s.i., by turning the knobs 54, 55 after rough adjustment of the positioning of piston 16 by means of screw 50. The extremely low torque drive permits finger knob leak rate adjustment. Counterclockwise rotation increases the rate, and at an increasing rate of change as the size of the leak increases. This gives precise control in proper proportion to the size of the leak. Clockwise rotation of the knobs 54, 55 decreases the rate until a seal is created when the surface 19 is pressed against the gasket 21. Utilization of a smooth hard surface 19 and the gasket 21 assures smooth separation even after repeated seals.

The valve is operable at atmospheric to below $10^{-11}$ torr pressures. In normal operation a minimum leak rate of approximately $1 \times 10^{-9}$ torr liters/sec. may be expected. At smaller rates the outlet 15 is of such size that condensible vapors will in time close the outlet 15 and stop the leak. Under these circumstances it is recommended that the valve 11 be baked to 250° C. for 30 minutes to drive off adsorbed vapors within the valve 11. For operation at leak rates of $10^{-10}$ and lower, the inlet gas must be free of condensible vapors. These can be eliminated by passing the gas through a drying agent such as a molecular sieve or by cold-trapping the gas line with liquid nitrogen or other suitable coolants.

The valve construction (which is all-metal except for the member 18) permits bakeout of the valve 11 including the valve actuating mechanism 22, in either the open or closed position, to 450° C. Repeated high temperature bakeouts, however, will in time result in pressure annealing of the washer 59, and a loss of spring tension. This will be evidenced by decreasing sensitivity of control at high leak rates. This may be compensated for by tightening of the nut 58.

The dimensions of the valve actuating mechanism are chosen to result in a mechanical advantage at the control knobs of approximately 13,750 to 1 for producing very fine motion control. The ratio of motion at the periphery of the knobs to piston motion is the same as the mechanical advantage only when the valve actuating mechanism is not stressed, i.e., no contact between closure surface and seating surface. When the valve is nearly closed (the condition of small leaks), the valve actuating mechanism is highly stressed, deflecting in the manner of a stiff leaf spring and the motion ratio becomes much greater. This results in a desirable exponential relationship between leak rate and control knob motion.

The valve 11 can be used for rough pumping some systems. The valve piston 16 must be opened to its maximum conductance by means of screw 50 and a roughing pump (not shown) connected to the inlet 14 for this operation.

Since many changes can be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:
1. A high vacuum leak valve comprising: a cylindrical shell having an upper and a lower portion; a central vertical passageway defined within said shell upper portion; a cylindrical valve member adapted for reciprocal movement within said upper passageway; said valve member having a recessed cavity at its lower end provided with a sapphire disc having a highly polished closure surface; a diaphragm sealed between said shell lower portion and said valve member forming a flexible, vacuum-tight joint therebetween; an inlet passage defined within said lower shell below said diaphragm; a nut mounted on said valve member and a compressible washer connected between said nut and said shell lower portion for preloading said valve member; a valve actuating mecha- nism including a handle pivotally mounted to said cylindrical shell upper portion, said handle having a threaded channel and a roughing screw engaged within said channel, said handle having another threaded opening and an actuating screw threadedly engaged in said opening, said actuating screw having a ball socketed end contacting said shell lower portion, and a knob for turning said actuating screw to cause pivotal motion of said handle; a free-riding rod link operatively connected between said roughing screw and said valve member to cause a rough reciprocal motion of said valve member upon turning of said roughing screw and a fine reciprocal motion upon pivotal motion of said handle; a central vertical passageway defined within said shell lower portion forming an outlet; a neck terminating the upper end of said lower passageway having a vertical inner wall and a slanted side wall facing toward said passageway; a removable valve seat disposed within said lower passageway, said seat including, a retaining sleeve having an upper end provided with an outer, horizontal step and vertical riser, a soft metal gasket ring having a horizontal lower portion and a vertical upper portion and disposed about said sleeve, said gasket lower portion and upper portion fitting tightly against said step and riser, respectively, and a collar disposed tightly about said gasket upper portion, said gasket upper portion being fully captured and supported between said collar and riser and having a tapered seating surface extending above said collar and sleeve facing said closure surface; upon installation, said gasket lower portion being crushed between said slanted side and said sleeve to form a vacuum-tight seal between said valve seat and said shell lower portion and upon valve closure said tapered seating surface and said closure surface forming a vacuum-tight seal therebetween.

2. A high vacuum leak valve comprising: a cylindrical shell having an upper and a lower portion; a central vertical passageway defined within said shell upper portion; a cylindrical valve member adapted for reciprocal movement within said upper passageway, said valve member having a recessed cavity at its lower end provided with a sapphire disc having a highly polished closure surface; a diaphragm sealed between said shell portion and said valve member forming a flexible, vacuum-tight joint therebetween; an inlet passage defined within said lower shell below said diaphragm; means for preloading said valve member operatively connected between said valve member and said shell upper portion; a valve actuating mechanism including means to cause rough reciprocal motion of said valve member and means to cause a fine reciprocal motion of said valve member; operatively connected to said valve member; a central vertical passageway defined within said shell lower portion forming an outlet; a neck terminating the upper end of said lower passageway having a vertical inner wall and a slanted side wall facing toward said passageway; a removable valve seat disposed within said lower passageway; said seat including, a retaining sleeve having an upper end provided with an outer horizontal step and vertical riser, a soft metal gasket ring having a horizontal lower portion and a vertical upper portion and disposed about said sleeve, said gasket lower portion and upper portion fitting tightly against said step and riser, respectively, and a collar disposed tightly about said gasket upper portion, said gasket upper portion being fully supported and captured between said collar and riser and having a tapered seating surface extending above said collar and sleeve facing said closure surface; upon installation, said gasket lower portion being crushed between said slanted side and said sleeve to form a vacuum-tight seal between said valve seat and said shell lower portion and upon valve closure said tapered seating surface and said closure surface forming a vacuum-tight seal therebetween.

3. A high vacuum leak valve comprising: a valve shell provided with an inlet opening and an outlet passage; a valve seat disposed within said outlet passage; a valve member disposed within said shell adapted for movement relative to said valve seat and to be engaged by said valve seat upon valve closure; said outlet passage being provided with a neck terminating its upper end, said neck having a vertical inner wall and a slanted side wall facing toward said passage; said seat including a retaining sleeve having an upper end provided with an outer horizontal step and a vertical riser, a soft metal gasket ring having a horizontal lower portion and a vertical upper portion and disposed about said sleeve, said gasket lower portion fitting tightly against said step and riser and said slanted side wall, said gasket upper portion fitting tightly against said riser, and a collar disposed tightly about said gasket upper portion, said gasket upper portion having a seating surface extending above said collar and sleeve; said valve member being provided with a sapphire disc having a highly polished closure surface facing said seating surface; upon installation, said gasket lower portion being crushed between said slanted side and said sleeve to form a vacuum-tight seal between said vaive seat said shell and upon valve closure said seating surface and said closure surface forming a vacuum-tight seal therebetween.

4. A high vacuum leak valve comprising: a valve shell provided with an inlet opening and an outlet passage; a valve seat disposed within said outlet passage; a valve member disposed within said shell adapted for movement relative to said valve seat and to be engaged by said valve seat upon valve closure; said seat including a retaining sleeve, a soft metal gasket having an upper and lower portion disposed tightly about said sleeve, and a collar disposed tightly about said gasket ring upper portion, said gasket having a seating surface extending above said collar and sleeve; said gasket ring lower portion extending outwardly beyond said collar in tight fitting relationship with said valve shell; said valve member being provided with a highly polished closure surface facing said seating surface; and, upon valve closure said seating surface and said closure surface forming a vacuum-tight seal therebetween.

5. A high vacuum leak valve comprising: a shell structure having upper and lower ends; a valve seat in said shell structure; a valve member mounted in said shell for movement toward and away from said seat; a free-riding rod link having top and bottom ball socketed ends with the bottom end engaging said valve member; a pivot rod in the upper end of said shell; an L-shaped lever pivoted about said pivot rod and having one leg positioned at the top of said shell structure and its other leg extending along the side of said shell structure, a first screw threaded channel in said one leg of the L-shaped lever, a first adjustment screw threaded in said first channel and engaging the top end of said free-riding rod link to provide a coarse valve setting; a second screw threaded channel in said other leg of said L-shaped lever; and a second adjustment screw threaded in said second channel and engaging the side of said shell structure.

6. A high vacuum leak valve comprising: a shell structure; a valve seat in said shell structure; a movable piston having an upper threaded portion and a lower valve closure surface mounted in said shell structure for straight line movement relative to said valve seat; a retaining nut on said upper threaded portion; and a spring between said nut and said shell structure to provide a force tending to move said valve member away from said valve seat, said retaining nut functioning to adjustably retain said spring under a predetermined amount of compression; a valve member actuating lever pivotally attached to said shell structure for turning movement about a pivot axis for applying a force substantially along said straight line; a rod link positioned between said lever and said valve member; one end of said rod link being pivotally associated with said valve member and the other end of said rod link being pivotally associated with said lever; and adjustable control means cooperating with said lever to provide actuating force to turn said lever about said pivot axis.

References Cited

UNITED STATES PATENTS

| | | | |
|---|---|---|---|
| 463,175 | 11/1891 | St. John | 251—363 |
| 1,364,848 | 1/1921 | Walsh | 251—363 X |
| 2,192,339 | 3/1940 | Wilson | 251—363 X |
| 2,856,148 | 10/1958 | Heathcote et al. | 251—331 X |
| 3,071,150 | 1/1963 | Whitlock | 137—403 X |
| 3,160,391 | 12/1964 | Medicus et al. | 251—368 X |
| 2,894,531 | 7/1959 | Thomas et al. | 251—337 X |

FOREIGN PATENTS 507,580  9/1930  Germany.

WILLIAM F. O'DEA, *Primary Examiner.*

D. R. MATTHEWS, *Assistant Examiner.*